United States Patent
Tametani

(10) Patent No.: US 11,738,635 B2
(45) Date of Patent: Aug. 29, 2023

(54) DUAL OUTPUT ACTUATOR

(71) Applicant: INTEVA PRODUCTS, LLC, Troy, MI (US)

(72) Inventor: Yoshihiko Tametani, Yokohama (JP)

(73) Assignee: INTEVA PRODUCTS, LLC, Troy, MI (US)

(*) Notice: Subject to any disclaimer, the term of this patent is extended or adjusted under 35 U.S.C. 154(b) by 408 days.

(21) Appl. No.: 16/827,110

(22) Filed: Mar. 23, 2020

(65) Prior Publication Data
US 2021/0291641 A1   Sep. 23, 2021

(51) Int. Cl.
*B60K 11/08* (2006.01)
*F16D 11/14* (2006.01)
(Continued)

(52) U.S. Cl.
CPC ............ *B60K 11/085* (2013.01); *F16D 11/14* (2013.01); *B60K 11/04* (2013.01); *F16H 1/16* (2013.01)

(58) Field of Classification Search
CPC ......... B60K 11/085; B60K 11/04; F16H 1/16; F16H 37/04; F16H 37/041; F16H 37/06; F16H 37/065; F16H 1/227; F16H 1/22; F16H 1/206; F16H 1/20; F16H 1/006; F16H 37/16; F16H 2037/049; F16H 3/10; F16H 3/0915; F16H 3/085; F16H 3/02; B60R 19/52; F24F 14/08; F24F 14/10; F24F 14/1426; F24F 2013/1446; F16D 11/14; F16D 11/16; F16D 2011/006; F16D 2125/34; F16D 2011/008; F16D 2011/002; F16D 2011/004; F16D 11/10; F16D 11/06; F16D 2131/00; F16D 2300/00;
(Continued)

(56) References Cited

U.S. PATENT DOCUMENTS 3,572,482 A * 3/1971 Kalpas ................ F16D 67/02
192/223.1
4,534,506 A * 8/1985 Ishida ................ B60K 11/085
123/41.05
(Continued)

FOREIGN PATENT DOCUMENTS

DE 112007001053 B4   9/2012
DE 102011007522 A1 * 10/2012 ............ B60K 11/085
(Continued)

OTHER PUBLICATIONS

International Search Report for International Application No. PCT/US2020/053310; Date of Completion: Dec. 4, 2020; dated Jan. 14, 2021; 2 Pages.
(Continued)

*Primary Examiner* — T. Scott Fix
(74) *Attorney, Agent, or Firm* — Cantor Colburn LLP

(57) ABSTRACT

A dual output actuator for use with an active grill shutter system, including: a first output rotationally mounted about an axis; a second output rotationally mounted about the axis, the first output capable of independent rotation about the axis with respect to the second output and the second output capable of independent rotation about the axis with respect to the first output; and a gear rotationally mounted about the axis, the gear being capable of independently rotating either the first output or the second output by moving axially along the axis.

20 Claims, 14 Drawing Sheets

(51) Int. Cl.
*F16H 1/16* (2006.01)
*B60K 11/04* (2006.01)

(58) Field of Classification Search
CPC .... F16D 2125/48; F16D 2125/44; F16D 3/06; Y10T 74/19242; Y10T 74/19167; B60Y 2400/421; F01P 7/10; E06B 9/70
USPC ...... 180/68.1; 74/664, 665 R, 665 A, 665 B, 74/665 D, 665 E, 665 F, 665 G, 665 GA, 74/665 S, 665 T, 665 P, 745; 192/20, 192/54.51; 296/193.1; 293/115; 160/220, 219, 188, 185, 176.1 P, 149, 160/132, 107, 104, 91, 80
See application file for complete search history.

(56) References Cited

U.S. PATENT DOCUMENTS

| | | | | |
|---|---|---|---|---|
| 4,553,623 | A * | 11/1985 | Ohkubo | F16D 11/10 |
| | | | | 192/48.91 |
| 4,964,313 | A * | 10/1990 | Davis | F16D 25/088 |
| | | | | 192/48.91 |
| 5,159,854 | A * | 11/1992 | Mino | F16H 3/003 |
| | | | | 192/48.92 |
| 6,164,148 | A * | 12/2000 | Brouwer | B60R 1/072 |
| | | | | 192/48.92 |
| 6,609,440 | B1 * | 8/2003 | Chu | F16H 3/003 |
| | | | | 74/425.5 |
| 6,802,234 | B2 * | 10/2004 | Hsieh | B23Q 5/12 |
| | | | | 74/342 |
| 7,498,926 | B2 | 3/2009 | Browne et al. | |
| 9,827,848 | B1 * | 11/2017 | Sangha | B62D 35/005 |
| 9,878,609 | B2 * | 1/2018 | Dudar | F01P 7/02 |
| 10,363,811 | B2 | 7/2019 | Klop et al. | |
| 10,543,903 | B2 * | 1/2020 | Heiberg | B64C 13/34 |
| 2005/0012064 | A1 * | 1/2005 | Lay | F16D 11/10 |
| | | | | 251/249.5 |
| 2014/0158309 | A1 * | 6/2014 | Park | E05F 15/689 |
| | | | | 160/99 |
| 2016/0230820 | A1 * | 8/2016 | Matthews | F16D 7/044 |
| 2017/0122022 | A1 * | 5/2017 | Kim | F16D 27/14 |
| 2018/0119777 | A1 * | 5/2018 | Jung | E05F 15/697 |

FOREIGN PATENT DOCUMENTS

| | | | | |
|---|---|---|---|---|
| DE | 102011007524 | A1 * | 10/2012 | ............... F01P 7/10 |
| FR | 3020021 | A1 | 10/2015 | |
| FR | 3048924 | A1 * | 9/2017 | ........... B60K 11/085 |
| FR | 3101687 | A1 * | 4/2021 | ......... A01D 34/6812 |
| KR | 20050049044 | A * | 5/2005 | |
| KR | 101934796 | B1 | 1/2019 | |
| WO | WO-2013012337 | A1 * | 1/2013 | ............. B60K 11/08 |
| WO | WO-2014163488 | A1 * | 10/2014 | ............. B60K 11/08 |

OTHER PUBLICATIONS

Written Opinion for International Application No. PCT/US2020/053310; International Filing Date: Sep. 29, 2020; dated Jan. 14, 2021; 4 Pages.

* cited by examiner

DUAL OUTPUT ACTUATOR

BACKGROUND

Exemplary embodiments of the present disclosure pertain to dual output actuators and more particularly, a dual output actuator with sequential operation.

Active grill shutter systems are located at the front end or nose of a vehicle and can transition between an open position and a closed position. When the shutters are in the open position, they allow air to flow therethrough into the radiator and into the engine compartment, which allows for cooling of the engine and/or the radiator, as well as cooling several radiators/exchangers for air conditioning, air intake of turbo or compressor-charged engines, oil circuit coolers etc. When the shutters are in the closed position the air is blocked and rerouted around the vehicle, which reduces aerodynamic drag and fuel consumption. Also and in cold weather operating conditions this will reduce the warm-up time of the vehicle engine. As such and in some operating conditions and when this cooling air is not required, it is desirable to have the shutters closed. Alternatively and as mentioned above, other operating conditions may require the shutters to be open.

However, current active grille shutter system employ a synchronous movement for each of the vanes or shutters in the system. As such, current active grille shutter system cannot open or close vanes according to different areas (e.g., upper and lower areas). Also and in some conditions having all of the vanes or shutters of the system closed may not be an optimal solution for reducing aerodynamics drag. Due to the different working conditions of the different radiators, it is desirable to enable a selected control of different areas of the shutters, so that they can be actuated independently. In order to minimize complexity, weight and cost, it is not desirable to reproduce active grill shutter systems in parallel Accordingly, there is a desire to provide an improved actuator for an active grill shutter system of a vehicle enabling independent control of different active grill shutters.

BRIEF DESCRIPTION

Disclosed is a dual output actuator for use with an active grill shutter system, including: a first output rotationally mounted about an axis; a second output rotationally mounted about the axis, the first output capable of independent rotation about the axis with respect to the second output and the second output capable of independent rotation about the axis with respect to the first output; and a gear rotationally mounted about the axis, the gear being capable of independently rotating either the first output or the second output by moving axially along the axis.

In addition to one or more of the features described above, or as an alternative to any of the foregoing embodiments, the first output, the second output and the gear are each rotationally mounted about the axis within a housing and a cover secured to the housing.

In addition to one or more of the features described above, or as an alternative to any of the foregoing embodiments, the gear is operably coupled to a first worm gear rotationally mounted to the housing.

In addition to one or more of the features described above, or as an alternative to any of the foregoing embodiments, the gear is operably coupled to a first worm gear.

In addition to one or more of the features described above, or as an alternative to any of the foregoing embodiments, the dual output actuator includes a driving mechanism for rotating the first worm gear.

In addition to one or more of the features described above, or as an alternative to any of the foregoing embodiments, the driving mechanism includes a second worm gear, a first gear, a pinion gear, a motor and a printed circuit board, the second worm gear and the first gear being rotatably mounted to actuator and the pinion gear is operably coupled the motor, which is mounted to and controlled by the printed circuit board.

In addition to one or more of the features described above, or as an alternative to any of the foregoing embodiments, the gear has a first protrusion configured to engage a cavity of the first output when the gear is rotating the first output and a second protrusion configured to engage a cavity of the second output when the gear is rotating the second output such that as gear rotates about the axis the gear provides independent rotation of the first output and the second output about axis.

In addition to one or more of the features described above, or as an alternative to any of the foregoing embodiments, the first output has a tab that is configured to make contact with stopping ribs of a cover of the actuator and the second output is provided with a tab that is configured to make contact with stopping ribs of a housing of the actuator.

In addition to one or more of the features described above, or as an alternative to any of the foregoing embodiments, the first output has a tab that is configured to make contact with stopping ribs of a cover of the actuator and the second output is provided with a tab that is configured to make contact with stopping ribs of a housing of the actuator.

In addition to one or more of the features described above, or as an alternative to any of the foregoing embodiments, the first output is provided with a sealing member to provide a seal between the first output and an opening in a cover of the actuator and the second output is provided with a sealing member to provide a seal between the second output and an opening in a housing of the actuator.

In addition to one or more of the features described above, or as an alternative to any of the foregoing embodiments, the gear is slidably and rotationally mounted to the first output and the second output.

In addition to one or more of the features described above, or as an alternative to any of the foregoing embodiments, the gear has a first protrusion configured to engage a cavity of the first output when the gear is rotating the first output and a second protrusion configured to engage a cavity of the second output when the gear is rotating the second output such that as gear rotates about the axis the gear provides independent rotation of the first output and the second output about axis.

In addition to one or more of the features described above, or as an alternative to any of the foregoing embodiments, the gear is moved axially along the axis by a first worm gear operably coupled to the gear.

In addition to one or more of the features described above, or as an alternative to any of the foregoing embodiments, the dual output actuator includes a driving mechanism for rotating the first worm gear.

In addition to one or more of the features described above, or as an alternative to any of the foregoing embodiments, the gear has a first protrusion configured to engage a cavity of the first output when the gear is rotating the first output and a second protrusion configured to engage a cavity of the second output when the gear is rotating the second output such that as gear rotates about the axis the gear provides independent rotation of the first output and the second output about axis.

In addition to one or more of the features described above, or as an alternative to any of the foregoing embodiments, the first output has a tab that is configured to make contact with stopping ribs of a cover of the actuator and the second output is provided with a tab that is configured to make contact with stopping ribs of a housing of the actuator.

Also disclosed is an active grill shutter system, the active grill shutter system including: a plurality of vanes including a first portion of vanes and a second portion of vanes; a dual output actuator including: a first output rotationally mounted about an axis, the first output operably coupled to the first portion of vanes; a second output rotationally mounted about the axis, the second output operably coupled to the second portion of vanes, the first output capable of independent rotation about the axis with respect to the second output and the second output capable of independent rotation about the axis with respect to the first output; and a gear rotationally mounted about the axis, the gear being capable of independently rotating either the first output or the second output by moving axially along the axis.

In addition to one or more of the features described above, or as an alternative to any of the foregoing embodiments, the gear has a first protrusion configured to engage a cavity of the first output when the gear is rotating the first output and a second protrusion configured to engage a cavity of the second output when the gear is rotating the second output such that as gear rotates about the axis the gear provides independent rotation of the first output and the second output about axis.

In addition to one or more of the features described above, or as an alternative to any of the foregoing embodiments, the first output has a tab that is configured to make contact with stopping ribs of a cover of the actuator and the second output is provided with a tab that is configured to make contact with stopping ribs of a housing of the actuator.

Also disclosed is a method of providing a dual output from an actuator of an active grill shutter system, including: rotationally mounting a first output about an axis; rotationally mounting a second output about the axis, the first output capable of independent rotation about the axis with respect to the second output and the second output capable of independent rotation about the axis with respect to the first output; and rotationally mounting a gear about the axis, the gear being capable of independently rotating either the first output or the second output by moving axially along the axis.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
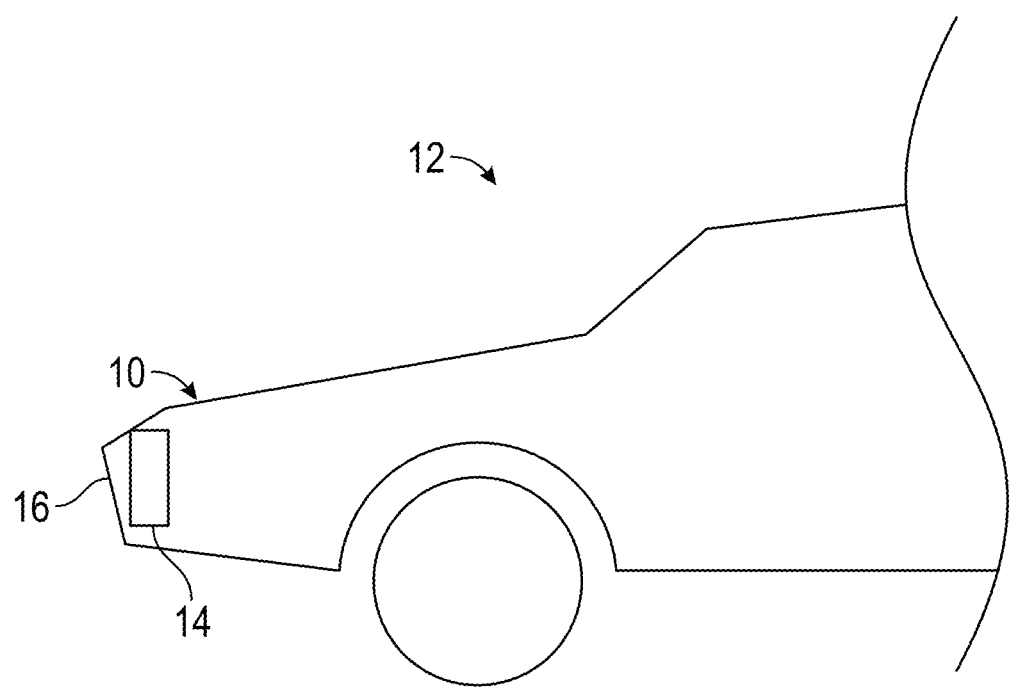
FIG. 1 is a partial schematic view of a forward portion of a vehicle with an active grill shutter system.

Referring now to FIG. 1 a partial schematic view of a forward portion 10 of a vehicle 12 with an active grill shutter system 14 is illustrated. Active grill shutter systems are located at a front end or nose 16 of the vehicle 12 and can transition between an open position and a closed position. When the shutters or vanes of the active grill shutter system 14 are in the open position, they allow air to flow through the system into the radiator and into the engine compartment, which allows for cooling of the engine and/or the radiator. Alternatively and when the shutters or vanes are in the closed position the air is blocked and rerouted around the vehicle, which reduces aerodynamic drag and fuel consumption. Also and in cold weather operating conditions this will reduce the warm-up time of the vehicle's engine.

Figure 2C:
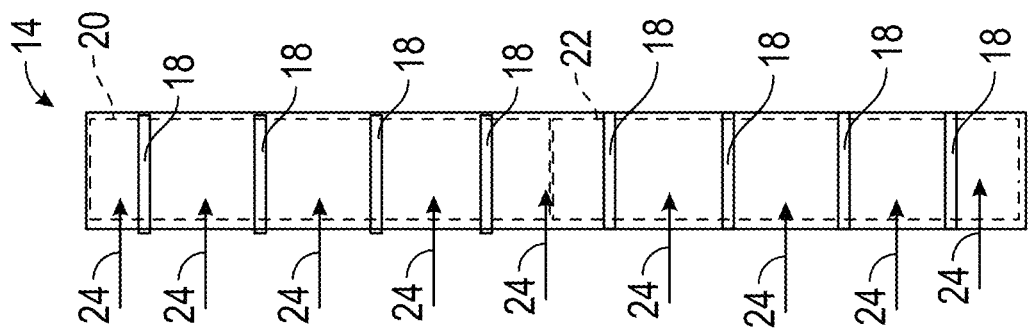
FIGS. 2A-2E are views illustrating various positions of an active grill shutter system in accordance with the present disclosure.
Figure 2B:
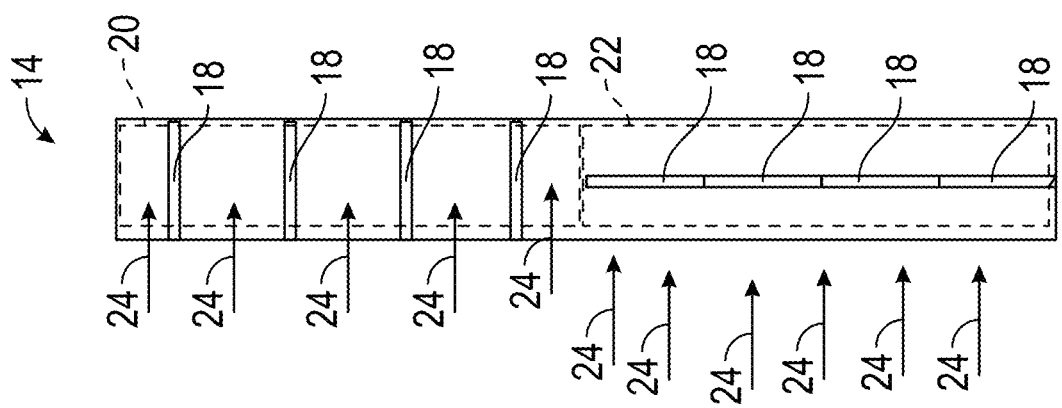
Figure 2A:
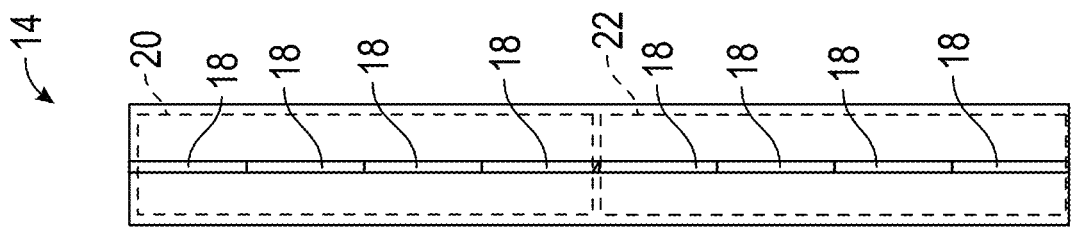
Figure 2A:
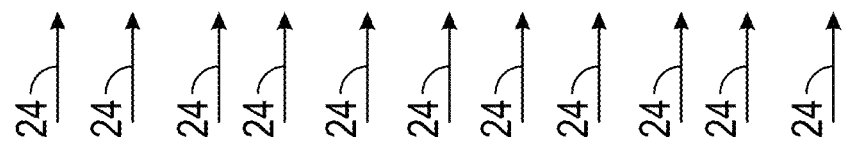

Referring now to FIGS. 2A-2E various positions of an active grill shutter system 14 in accordance with the present disclosure are illustrated. In FIG. 2A a plurality of vanes or shutters 18 of the active grill shutter system 14 are illustrated in the closed position, which may also be referred to a first or initial operational position of the active grill shutter system 14. In addition, the plurality of vanes or shutters 18 of the active grill shutter system 14 includes a first or upper portion 20, which comprises some of the plurality of vanes or shutters 18 and a second or lower portion 22, which comprises the remaining plurality of vanes or shutters 18 that are not in the first or upper portion 20. As used herein upper portion 20 may refer to a plurality of vanes or shutters 18 of the active grill shutter system 14 that are located in higher position than the remaining plurality of vanes or shutters 18 of the active grill shutter system 14 of the vehicle. Airflow blocked by the active grill shutter system 14 is illustrated by arrows 24.

As contemplated herein, the plurality of vanes or shutters 18 of the first or upper portion 20 are configured to move simultaneously through actuation of a first output operably coupled to the plurality of vanes or shutters 18 of the first or upper portion 20 by for example linkage and the plurality of vanes or shutters 18 of the second or lower portion 22, which comprise the remaining plurality of vanes or shutters 18 that are not in the first or upper portion 20, are configured to move simultaneously through actuation of a second output operably coupled to the plurality of vanes or shutters 18 of the second or lower portion 22 by for example linkage.

In FIG. 2B the plurality of vanes or shutters 18 of the first or upper portion 20 of the active grill shutter system 14 are illustrated in the open position and the plurality of vanes or shutters 18 of the second or lower portion 22 are illustrated in the closed position, which may also be referred to a second operational position of the active grill shutter system 14. Here airflow illustrated by arrows 24 is allowed to pass through the vanes or shutters 18 of the first or upper portion 20 of the active grill shutter system 14 while the plurality of vanes or shutters 18 of the second or lower portion 22 block airflow.

In FIG. 2C the plurality of vanes or shutters 18 of the first or upper portion 20 of the active grill shutter system 14 are illustrated in the open position and the plurality of vanes or shutters 18 of the second or lower portion 22 are illustrated in the open position, which may also be referred to a third operational position of the active grill shutter system 14. Here airflow illustrated by arrows 24 is allowed to pass through the vanes or shutters 18 of the first or upper portion 20 of the active grill shutter system 14 and the plurality of vanes or shutters 18 of the second or lower portion 22 of the active grill shutter system 14.

Figure 2D:
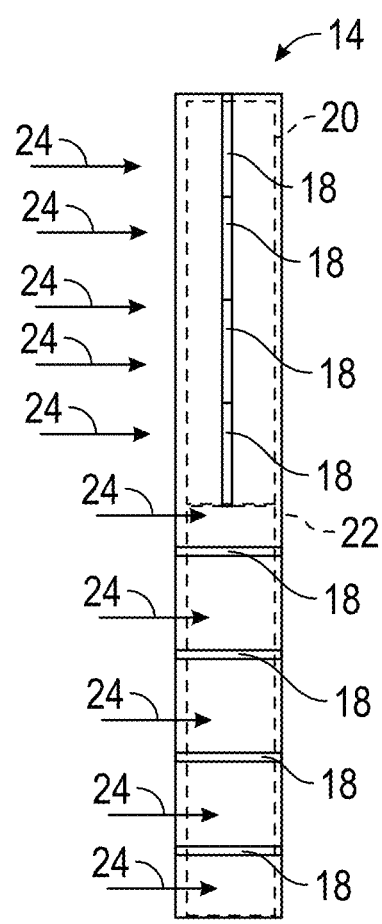

In FIG. 2D the plurality of vanes or shutters 18 of the first or upper portion 20 of the active grill shutter system 14 are illustrated in the closed position and the plurality of vanes or shutters 18 of the second or lower portion 22 are illustrated in the open position, which may also be referred to a fourth operational position of the active grill shutter system 14. Here airflow illustrated by arrows 24 is blocked by the vanes or shutters 18 of the first or upper portion 20 of the active grill shutter system 14 and airflow is allowed to pass through the plurality of vanes or shutters 18 of the second or lower portion 22 of the active grill shutter system 14.

Figure 2E:
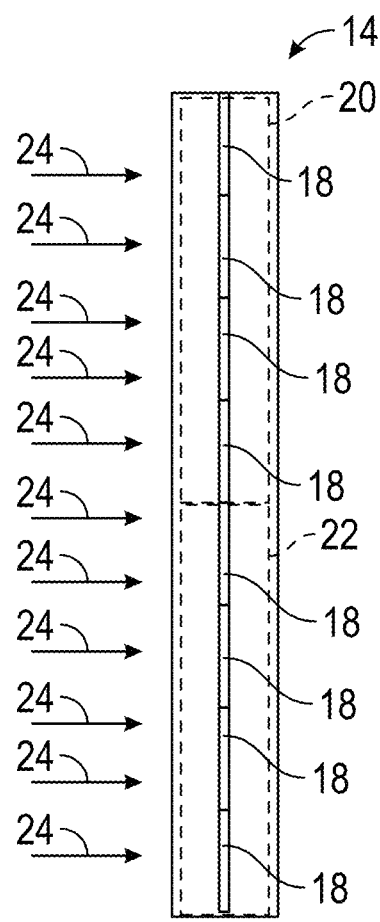
Figure 3:
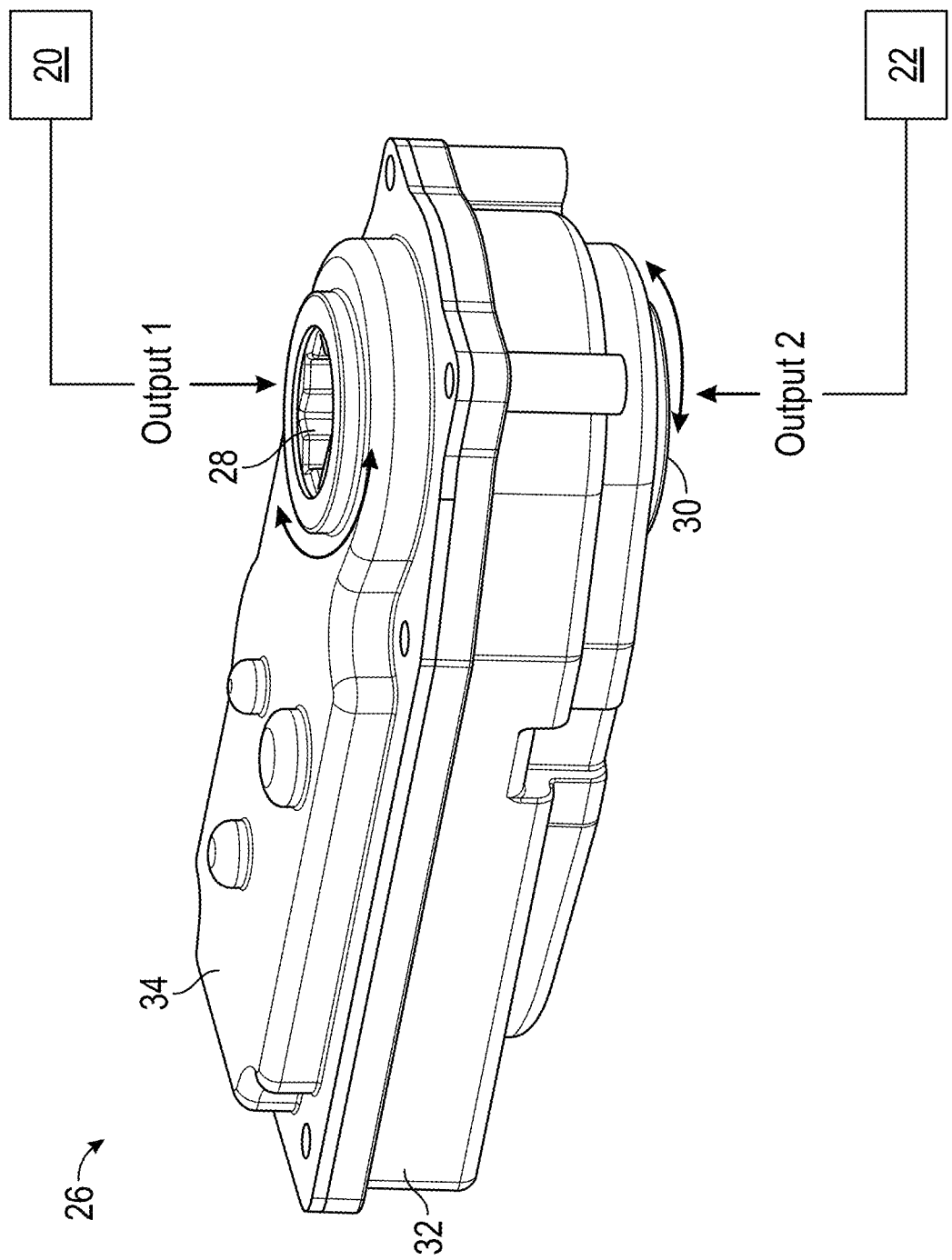
FIG. 3 is a perspective view of a dual output actuator completed for use with an active grill shutter system in accordance with an embodiment of the present disclosure.

FIG. 2E illustrates the plurality of vanes or shutters 18 of the first or upper portion 20 of the active grill shutter system 14 and the plurality of vanes or shutters 18 of the second or lower portion 22 in the closed position after movement from the fourth operational position, which is similar to the position illustrated in FIG. 2A.

Referring now to FIGS. 3-12, a dual output actuator 26 in accordance with the present disclosure is illustrated. The dual output actuator 26 has a first output or first output shaft 28 and a second output or second output shaft 30. In one embodiment, the first output or first output shaft 28 is operably coupled to the first or upper portion 20 of the active grill shutter system 14 by for example, a mechanical linkage and the second output or second output shaft 30 is operably coupled to the second or lower portion 22 of the active grill shutter system 14 by for example, a mechanical linkage. The dual output actuator 26 also includes a housing 32 and a cover 34 configured to be secured to the housing.

Figure 4A:
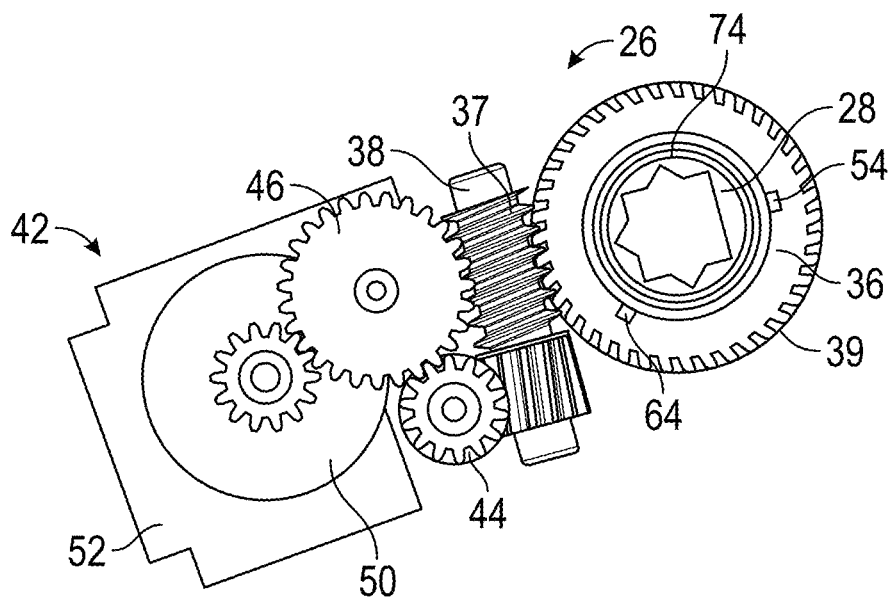
FIGS. 4A and 4B are perspective views of a dual output actuator with the housing and cover removed.
Figure 4B:
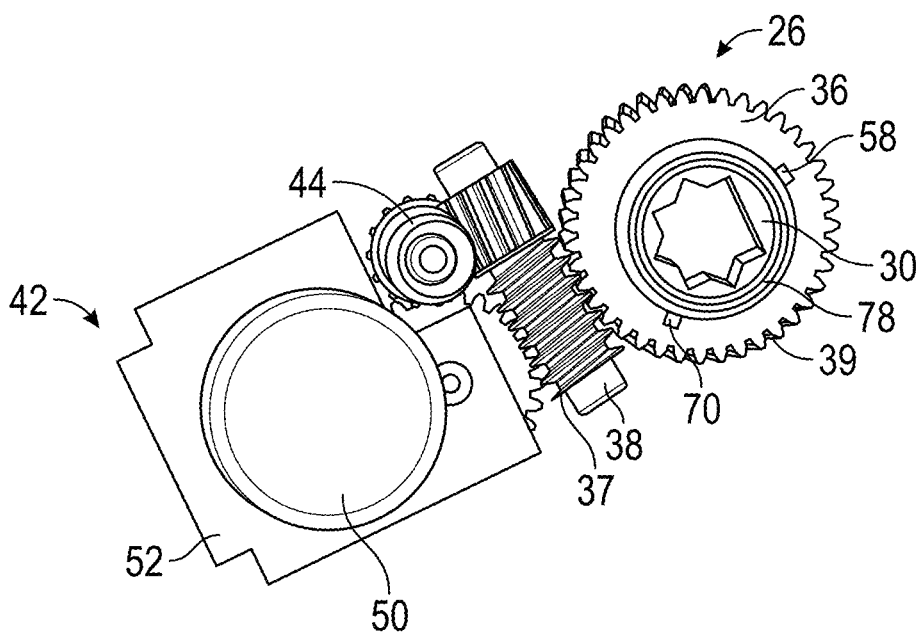

Referring now to FIGS. 4A and 4B, perspective views of the dual output actuator 26 without the housing 32 and cover 34 are provided. As illustrated, the dual output actuator 26 includes the first output or first output shaft 28 and the second output or second output shaft 30. The first output or first output shaft 28 being capable of independent movement with respect to the second output or second output shaft 30 and the second output or second output shaft 30 is capable of independent movement with respect to the first output or first output shaft 28.

Also shown in FIGS. 4A and 4B is a gear 36 operably coupled to and for individually rotating the first output or first output shaft 28 and the second output or second output shaft 30. In one embodiment, the gear 36 is slidably and rotationally mounted to the first output or first output shaft 28 and the second output or second output shaft 30. The gear 36 is also operably coupled to a first driving member or a first worm gear 38. The first driving member or first worm gear 38 is rotationally mounted to the housing 32.

In one embodiment and in order to provide a driving force the first driving member or first worm gear 38, a driving mechanism 42 is provided. In one embodiment, the driving mechanism 42 includes a second worm gear 44, a first gear 46, a pinion gear 48, a motor 50 and a printed circuit board 52. The second worm gear 44 and the first gear 46 are rotatably mounted to actuator 26 by for example being rotatably mounted to the housing 32 and the cover 34 and the pinion gear 48 is operably coupled the motor 50, which is mounted to and controlled by the printed circuit board 52. As illustrated, the second worm gear 44 is configured to mesh with the first driving member or the first worm gear 38 and the first gear 46 is configured to mesh with the second worm gear 44 while the pinion gear 48 is configured to mesh with the first gear 46 and the motor 50 is operably coupled to the pinion gear 48. As such and when the motor 50 is energized, the first output or first output shaft 28 and the second output or second output shaft 30 are capable of rotational movement about an axis.

Figure 5A:
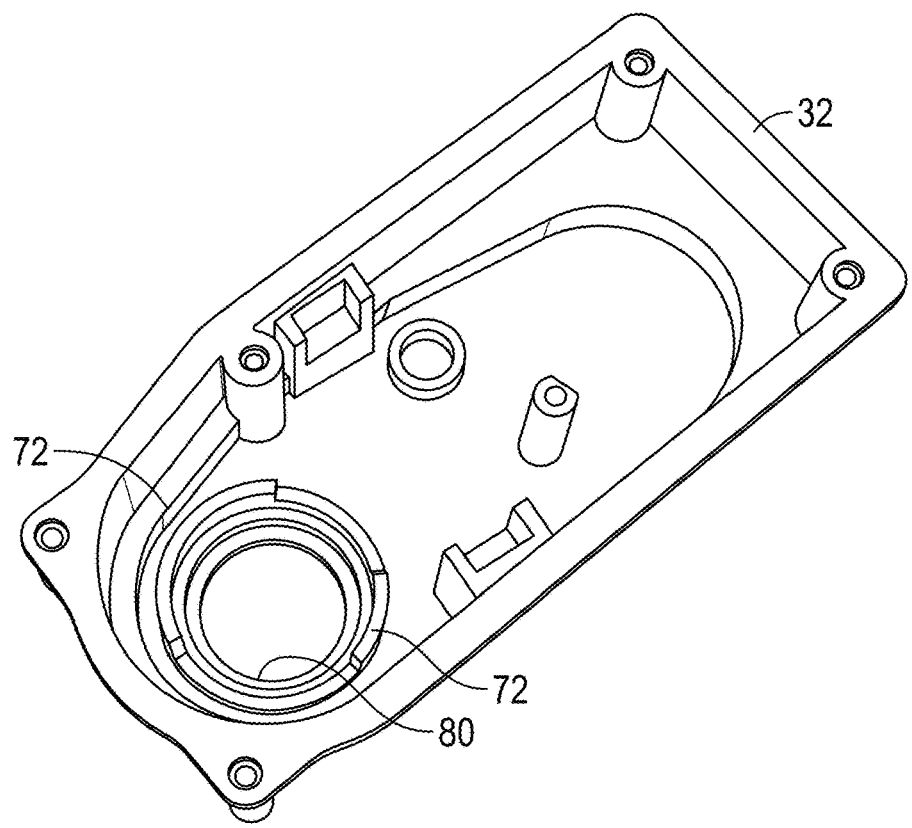
FIG. 5A illustrates the housing of the dual output actuator.
Figure 5B:
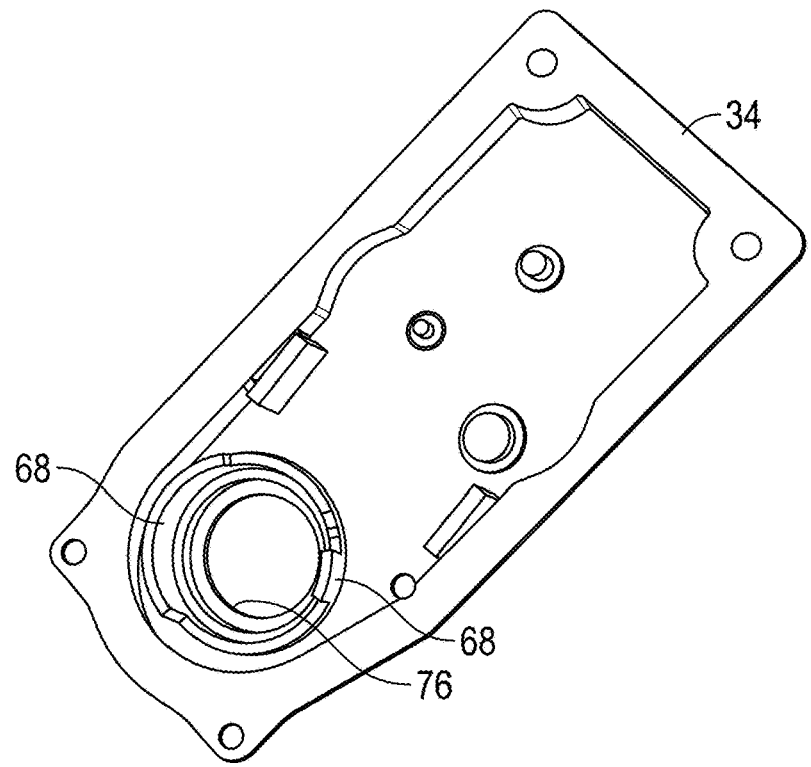
FIG. 5B illustrates the cover of the dual output actuator.

FIG. 5A illustrates the housing 32 of the dual output actuator 26 while FIG. 5B illustrates the cover 34 of the dual output actuator 26.

Figure 6:
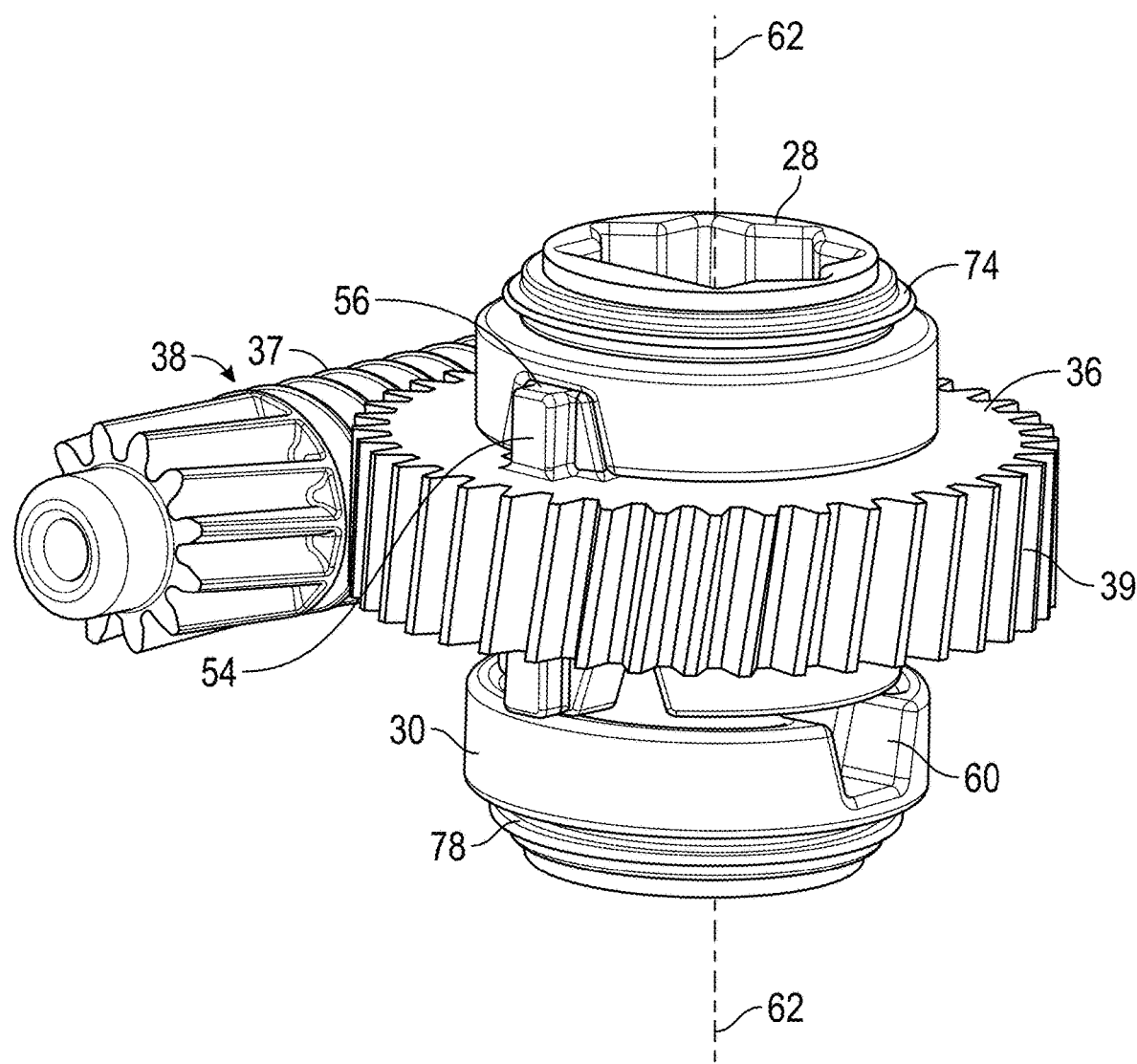
FIG. 6 is a perspective view of portions of the dual output actuator in a rest position.

FIG. 6 is a perspective view of portions of the dual output actuator 26 in a rest position, which may also be referred to as a home positon or a first operational position. As illustrated, the first driving member or first worm gear 38 has teeth 37 that mesh with teeth 39 of the gear 36. Gear 36 also has a first protrusion 54 configured to engage a cavity 56 of the first output or first output shaft 28 and a second protrusion 58 configured to engage a cavity 60 of the second output or second output shaft 30 such that as gear 36 rotates about an axis 62, the gear 36 can provide independent rotation of the first output or first output shaft 28 and the second output or second output shaft 30 about axis 62.

Figure 12:
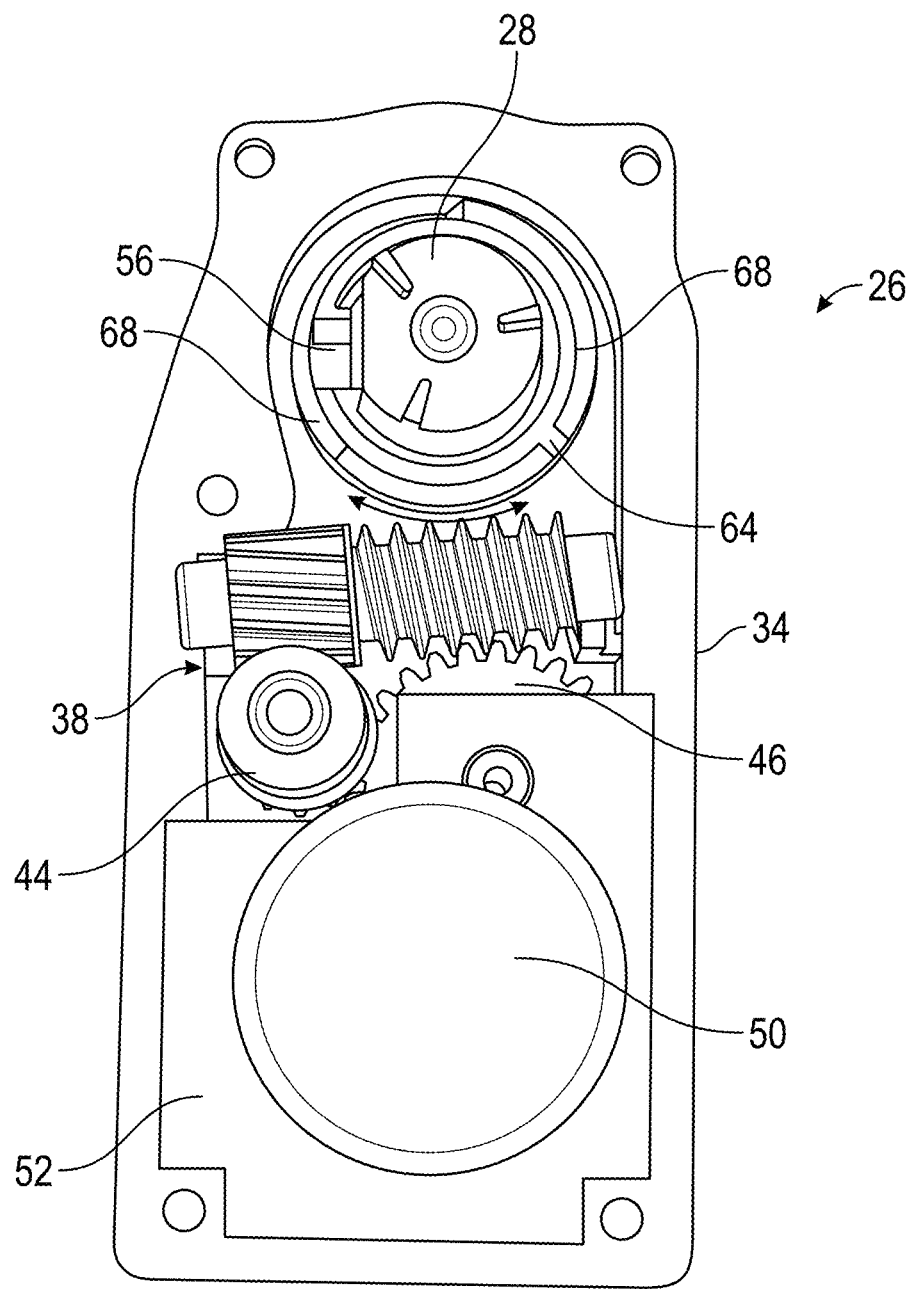
FIG. 12 is a view of a cover and a first output of the dual output actuator.

In order to allow for gear 36 to provide independent rotation of the first output or first output shaft 28 and the second output or second output shaft 30 about axis 62, the first output or first output shaft 28 is provided with a tab or protrusion 64 (See at least FIGS. 4A, 7B, 7C, 7D and 12) that is configured to make contact with guides or stopping ribs 68 of the cover 34 (See at least FIGS. 5B and 12). In addition and in order to allow for gear 36 to provide independent rotation of the first output or first output shaft 28 and the second output or second output shaft 30 about axis 62, the second output or second output shaft 30 is provided with a tab or protrusion 70 (See at least FIGS. 4B and 13) that is configured to make contact with guides or stopping ribs 72 of the housing 32 (See at least FIGS. 5A and 13).

Also shown in FIG. 6 is that the first output or first output shaft 28 is provided with a sealing member 74 to provide a seal between the first output or first output shaft 28 and an opening 76 in the cover 34 when the actuator 26 is assembled. The second output or second output shaft 30 is provided with a sealing member 78 to provide a seal between the second output or second output shaft 30 and an opening 80 in the housing 32 when the actuator 26 is assembled.

Figure 7A:
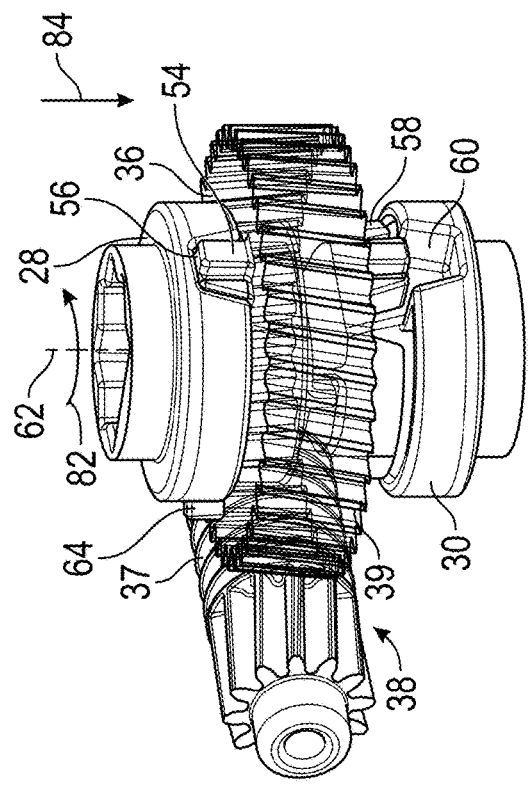
FIG. 7A is a perspective view of portions of the dual output actuator in a rest position.

FIG. 7A is a perspective view of portions of the dual output actuator 26 in a rest position, which may also be referred to as a home positon or a first operational position. The view of FIG. 7A is similar to that of FIG. 6.

Figure 7B:
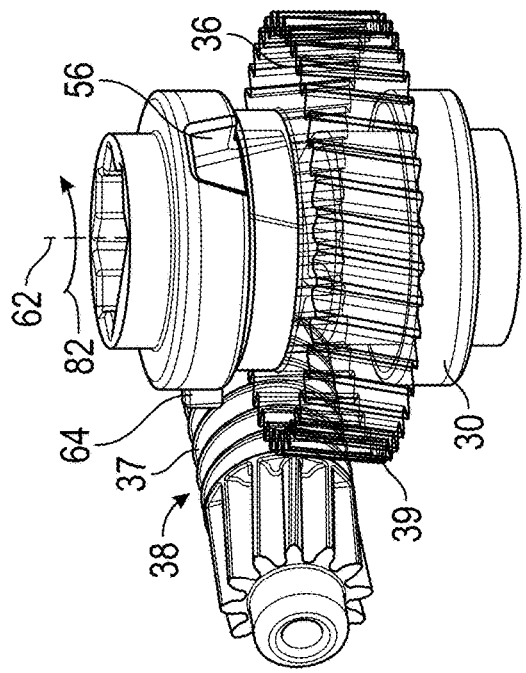
FIG. 7B is a perspective view of portions of the dual output actuator providing a first output in a full output position.

In FIG. 7B gear 36 has rotated in the direction of arrow 82 about axis 62 due to rotation of the first driving member or first worm gear 38 in a first direction. During this rotational movement of gear 36 in the direction of arrow 82, the first output or first output shaft 28 has also rotated in the direction of arrow 82 about axis 62 due to engagement of the first protrusion 54 in cavity 56. In FIG. 7B, the first output or first output shaft 28 has reached its full range of rotation and is stopped by tab or protrusion 64 making contact with guides or stopping ribs 68 of the cover 34.

Continued rotation of the rotation of the first driving member or first worm gear 38 in the first direction when the first output or first output shaft 28 of the actuator 26 is in the position illustrated in FIG. 7B will cause gear 36 to move along axis 62 in the direction of arrow 84. This is due to the fact that gear 36 is slidably mounted to the first output or first output shaft 28 and the second output or second output shaft 30. Also, the gear 36 and the first output or first output shaft 28 and the second output or second output shaft 30 are all rotationally mounted to actuator 26 for rotational movement about the same axis, axis 62. Gear 36 will move in this direction until the second protrusion 58 of the gear 36 is received in cavity 60. This axial movement of the gear 36 in the direction of arrow 84 will cause the first protrusion 54 to no longer make contact with cavity 56. As such, the gear 36 may continue to rotate in the direction of arrow 82 about axis 62. However and in the position illustrated in FIG. 7C, the second protrusion 58 of gear 36 is now received in cavity 60 of the second output or second output shaft 30. As such and when the gear 36 continues to rotate in the direction of arrow 82 about axis 62, the second output or second output shaft 30 also rotates about axis 62 in the direction of arrow 82 while the first output or first output shaft 28 of the actuator 26 remains in the position illustrated in FIGS. 7B and 7C.

Figure 7C:
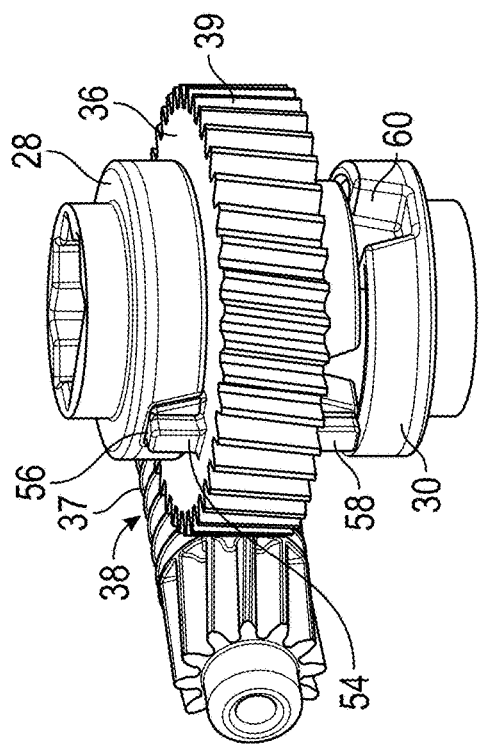
FIG. 7C is a perspective view of portions of the dual output actuator at the beginning of a second output position.
Figure 7D:
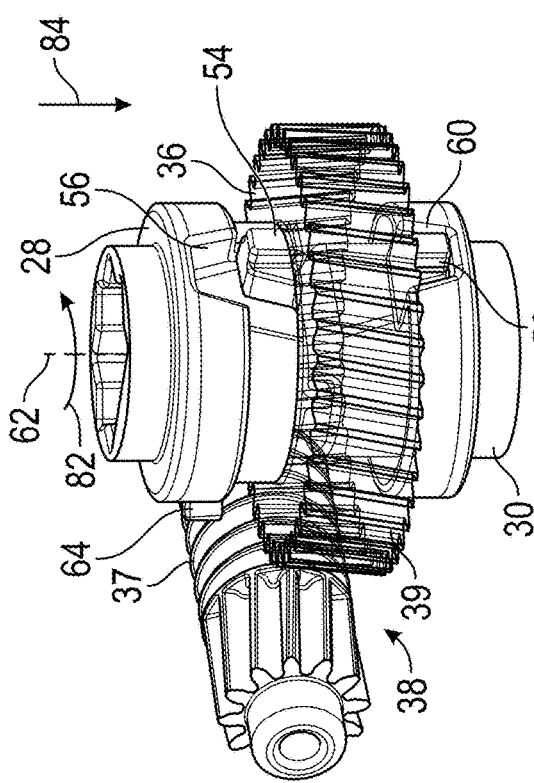
FIG. 7D is a perspective view of portions of the dual output actuator providing a second output in a full output position.

FIG. 7D illustrates when the second output or second output shaft 30 has rotated to its full travel positon in the direction of arrow 82 about axis 62, which is defined or caused by protrusion or tab 70 contacting guides or stopping ribs 72 of the housing 32. In this position, the first output or first output shaft 28 and the second output or second output shaft 30 are now in the full travel positons from the positions illustrated in at least FIG. 7A.

In order to return the first output or first output shaft 28 and the second output or second output shaft 30 back to the positions illustrated in at least FIG. 7A. The motor 50 is operated in reverse and the first driving member or first worm gear 38 is rotated in a second direction opposite to the first direction, which will cause the gear 36 to rotate in a direction opposite to arrow 82 about axis 62. Starting from the positon in FIG. 7D the gear 36 and the second output or second output shaft 30 will rotate in a direction opposite to arrow 82 about axis 62 due to second protrusion 58 engaging cavity 60 of the second output or second output shaft 30. This rotation will occur until protrusion or tab 70 contacts guides or stopping ribs 72 of the housing 32 (FIG. 7C). At this point, continued rotation of the first driving member or first worm gear 38 in the second direction will cause gear 36 to move axially about axis 62 in a direction opposite to arrow 84 until the first protrusion 54 is engaged with cavity 56 and the second protrusion 58 is no longer engaged with cavity 60 (FIG. 7B). At this point, continued rotation of the first driving member or first worm gear 38 in the second direction will cause gear 36 to rotate about axis 62 in a direction opposite to arrow 82 and the first output or first output shaft 28 will also rotate with gear 36 in a direction opposite to arrow 82 until the tab or protrusion 64 of the first output or first output shaft 28 makes contact with guides or stopping ribs 68 of the cover 34, which corresponds to the position illustrated in FIG. 7A.

Figure 8A:
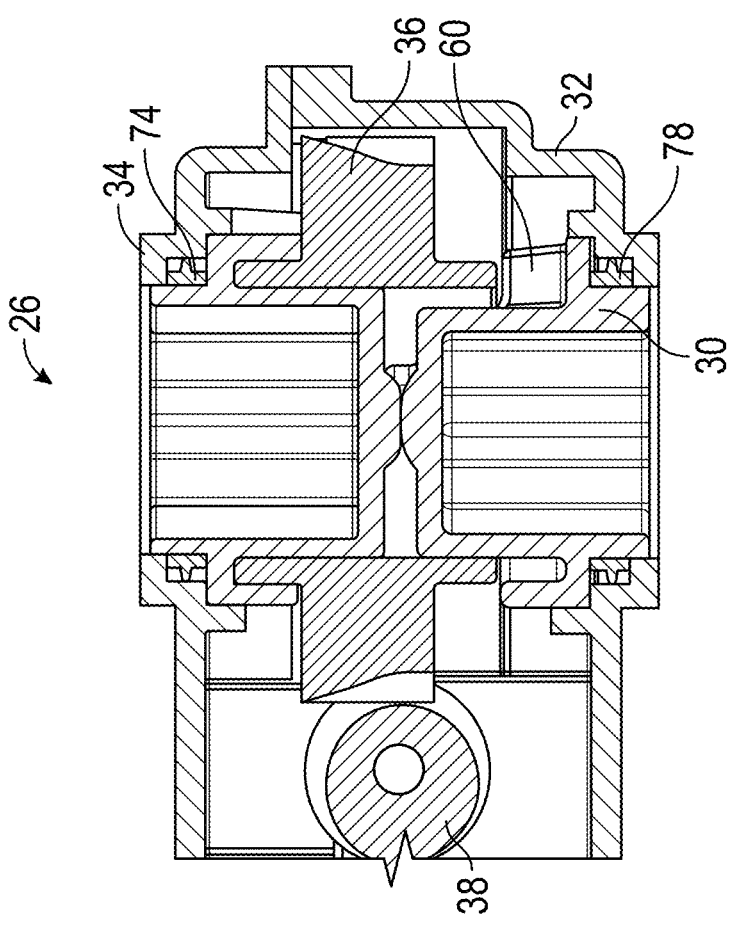
FIGS. 8A and 8B are cross-sectional views of the dual output actuator in a rest position.
Figure 8B:
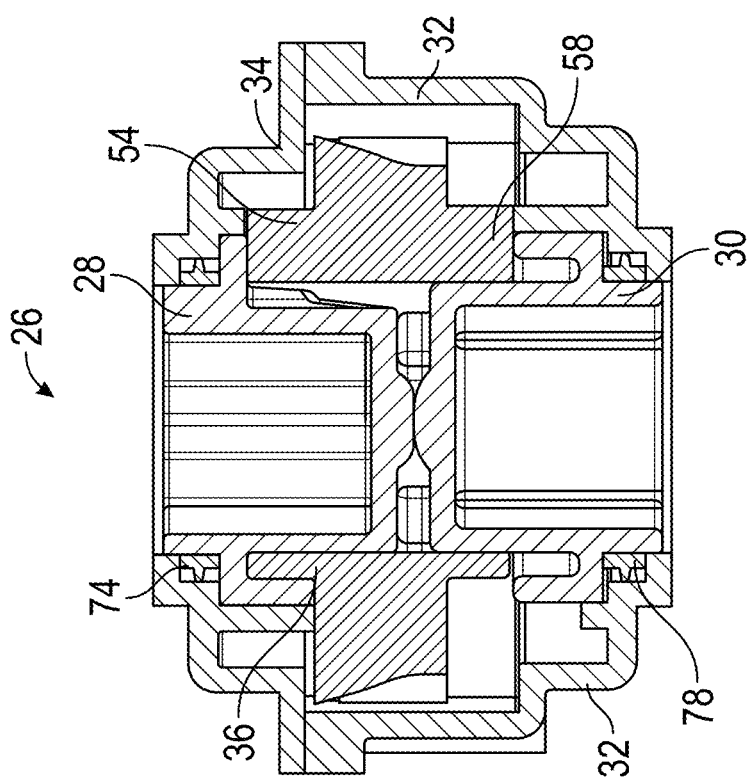
Figure 9B:
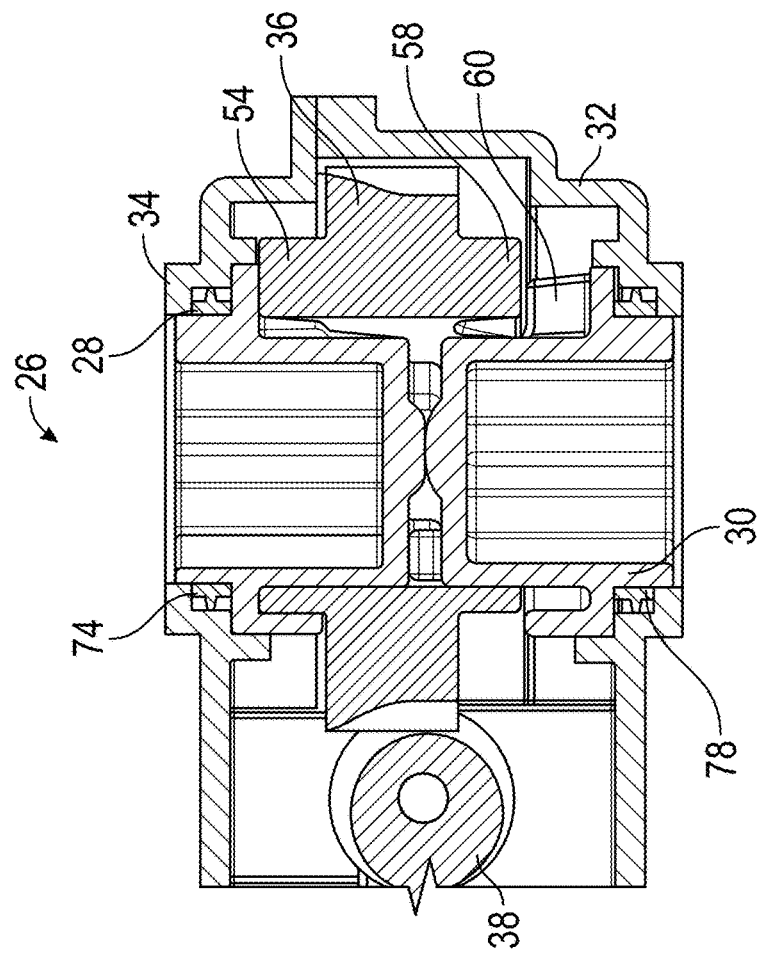
FIGS. 9A and 9B are cross-sectional views of the dual output actuator providing a first output in a full output position.
Figure 9A:
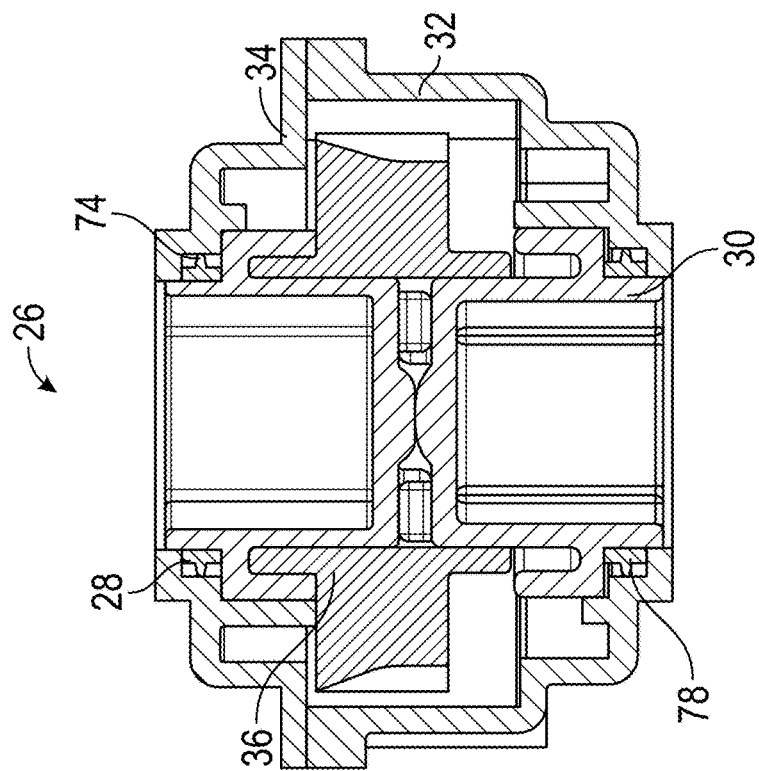
Figure 10B:
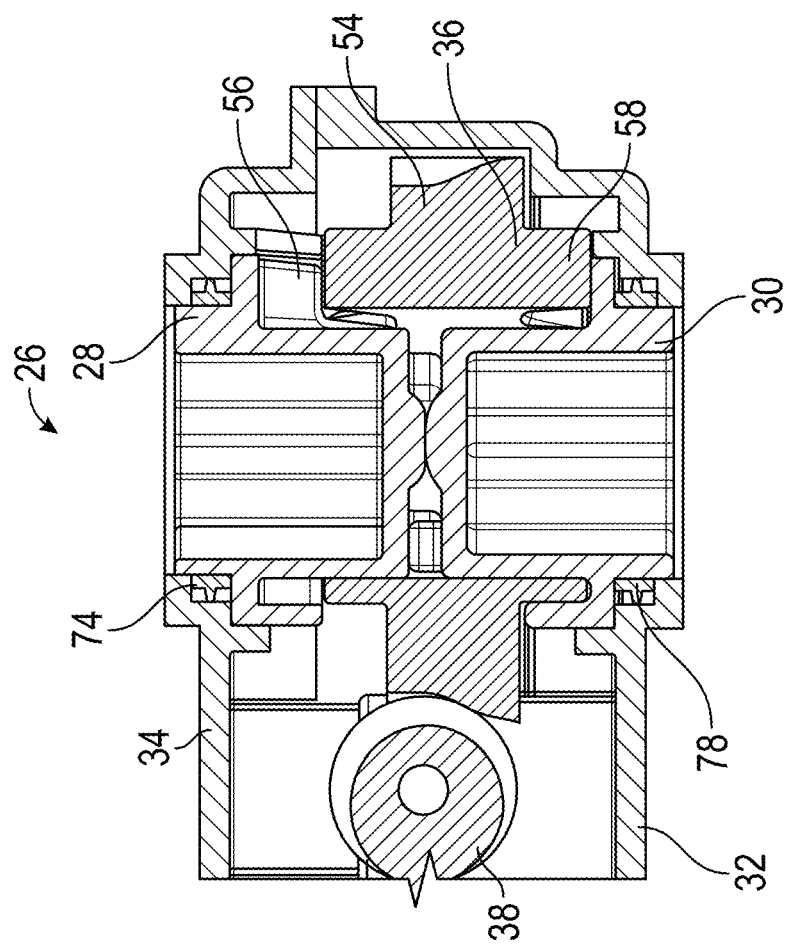
FIGS. 10A and 10B are cross-sectional views of the dual output actuator at the beginning of a second output position.
Figure 10A:
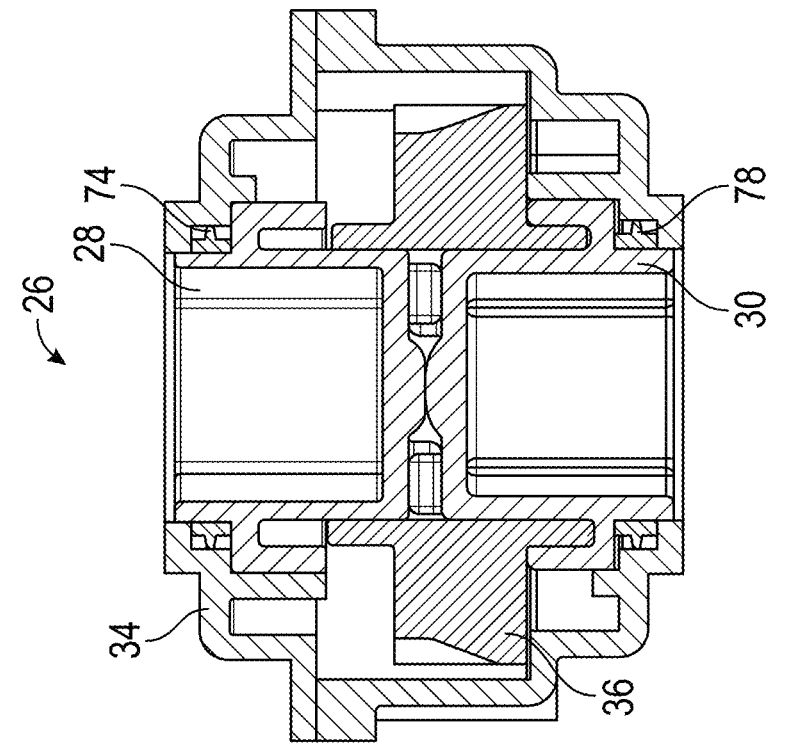
Figure 11B:
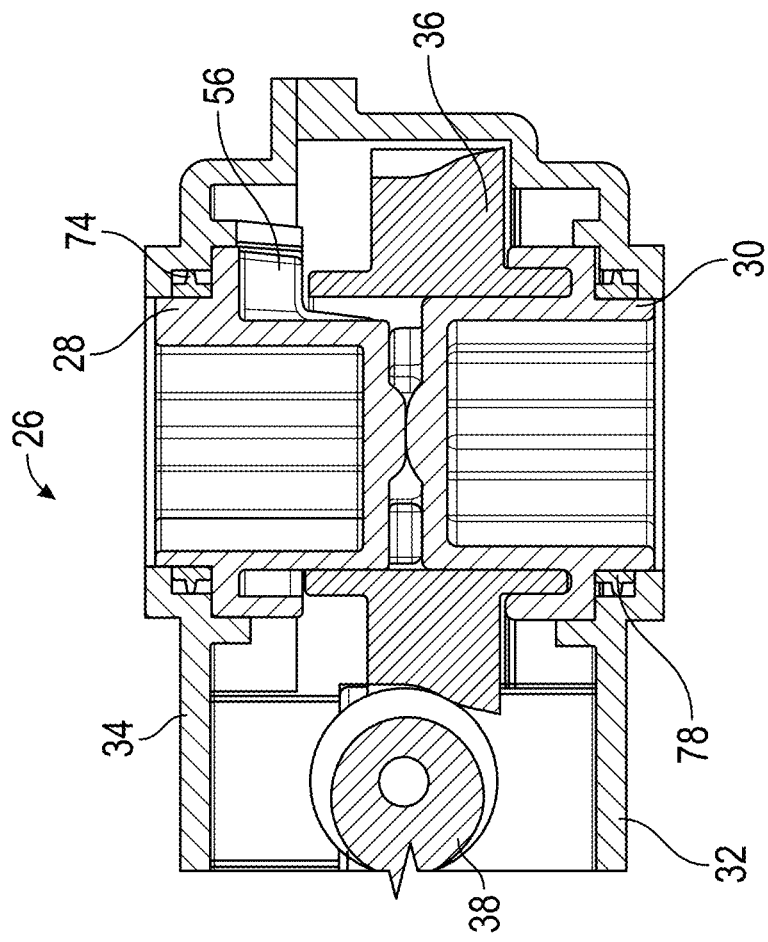
FIGS. 11A and 11B are cross-sectional views of the dual output actuator providing a second output in a full output position.
Figure 11A:
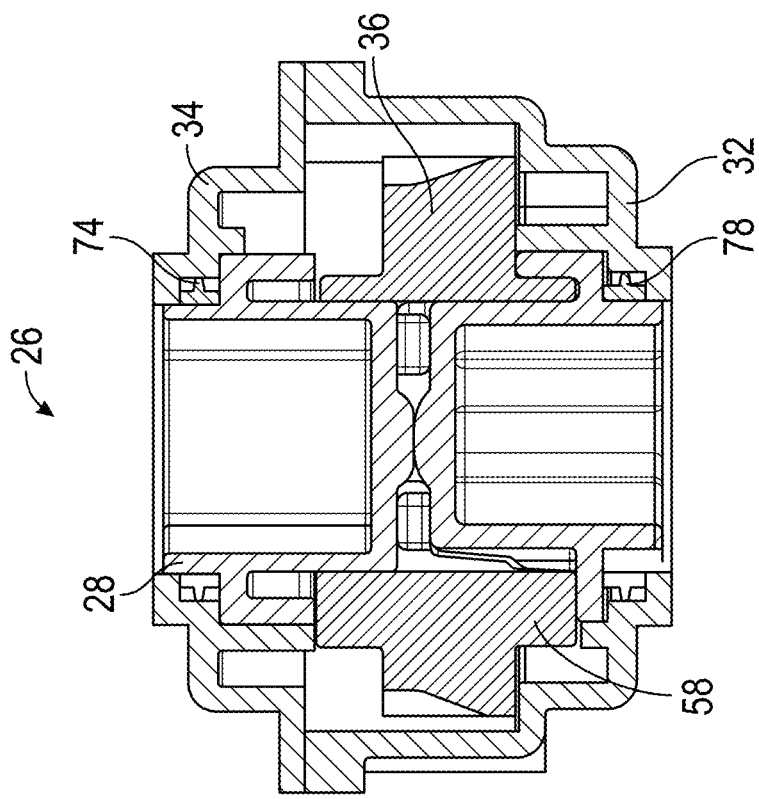

FIGS. 8A and 8B are cross-sectional views of the dual output actuator 26, which corresponds to the position illustrated in FIG. 7A. FIGS. 9A and 9B are cross-sectional views of the dual output actuator providing a first output in a full output position, which corresponds to the position illustrated in FIG. 7B. FIGS. 10A and 10B are cross-sectional views of the dual output actuator at the beginning of a second output position, which corresponds to the positon illustrated in FIG. 7C. FIGS. 11A and 11B are cross-sectional views of the dual output actuator 26 providing a second output in a full output position, which corresponds to the position illustrated in 7D.

FIG. 12 is a view of the cover 34 and the first output or first output shaft 28 wherein operational movement of tab or protrusion 64 between guides or stopping ribs 68 is illustrated.

Figure 13:
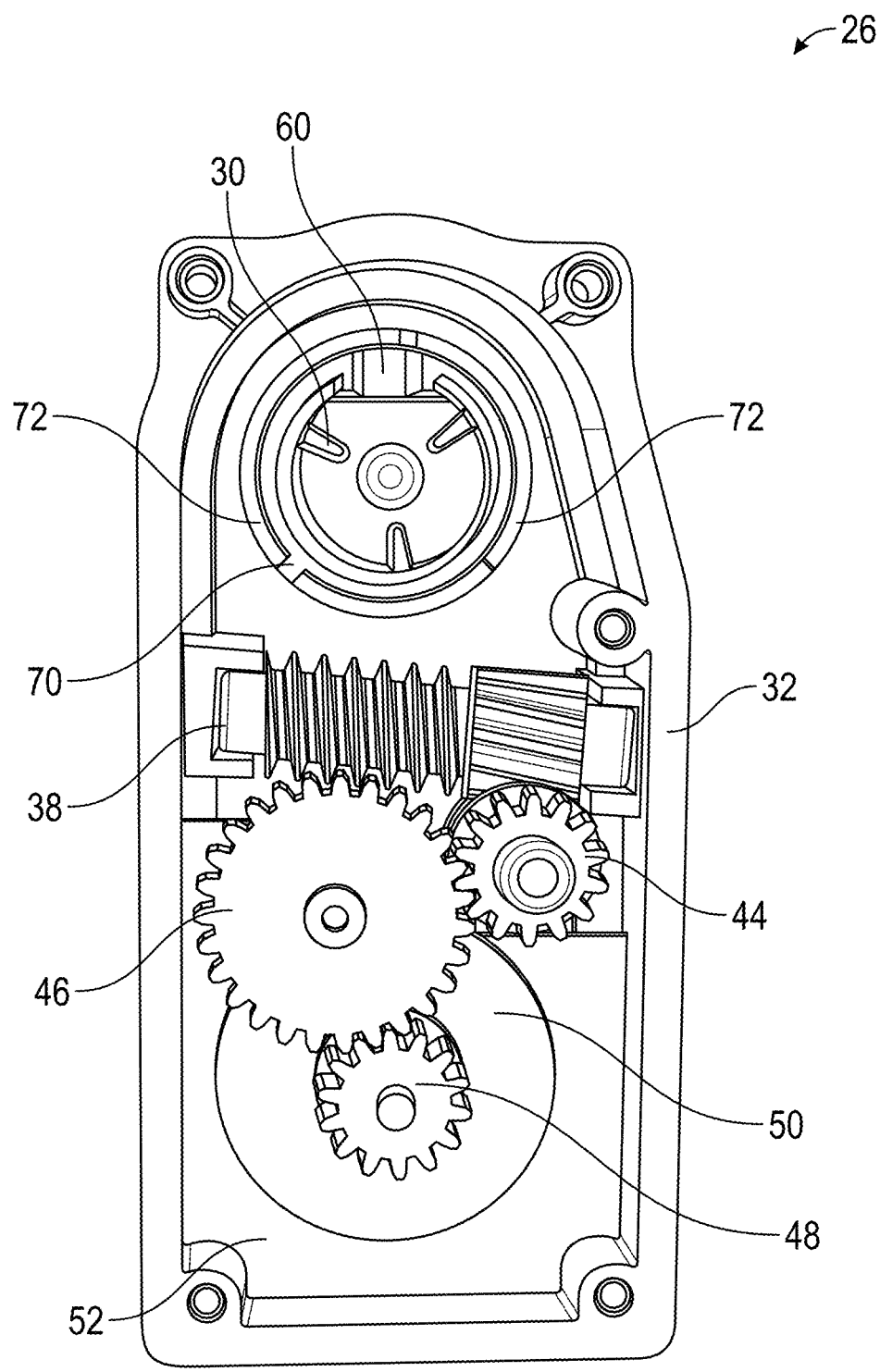
FIG. 13 is a view of the housing and a second output of the dual output actuator.

FIG. 13 is a view of the housing 32 and the second output or second output shaft 30 wherein operational movement of tab or protrusion 70 between guides or stopping ribs 72 is illustrated.

The dual output actuator 26 of the present disclosure allows the actuator 26 to maintain a torque while switching output sequentially using the same rotational axis 62.

The sequential dual output actuator 26 of the present disclosure has two outputs 28 and 30 wherein the after the first output has finished it range of travel the second output begins its operation until it meets its limit of travel. Reverse operation of the actuator 26 is also possible starting from the limit of the second output rotating the second output until it reaches a return limit and the first output begins it operation until its operation until it meets it limit of travel.

The actuator 26 of the present disclosure also allows the outputs 28, 30 to switch sequentially through operation of one gear 36. The single gear 36 is connected to one output shaft and then sequentially switches connection to another output shaft depending on the gear position. This is performed by sliding the gear 36 on the same axis 62 as output shafts 28, 30 and the worm 38 and a gear train apply a force to the gear 36 in order to switch its connection between the outputs 28, 30.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A dual output actuator for use with an active grill shutter system, comprising:
   a first output rotationally mounted about an axis;
   a second output rotationally mounted about the axis, the first output capable of independent rotation about the axis with respect to the second output and the second output capable of independent rotation about the axis with respect to the first output; and
   a gear rotationally mounted about the axis, the gear being capable of independently rotating either the first output or the second output by moving axially along the axis, the gear having an inner opening that slidably receives a first portion of the first output and a second portion of the second output.

2. The dual output actuator as in claim 1, wherein the first output, the second output and the gear are each rotationally mounted about the axis within a housing and a cover secured to the housing and the first portion of the first output and the second portion of the second output contact each other.

3. The dual output actuator as in claim 2, wherein the gear is operably coupled to a first worm gear rotationally mounted to the housing.

4. The dual output actuator as in claim 1, wherein the gear is operably coupled to a first worm gear.

5. The dual output actuator as in claim 4, further comprising a driving mechanism for rotating the first worm gear.

6. The dual output actuator as in claim 5, wherein the driving mechanism includes a second worm gear, a first gear, a pinion gear, a motor and a printed circuit board, the second worm gear and the first gear being rotatably mounted to the actuator and the pinion gear is operably coupled the motor, which is mounted to and controlled by the printed circuit board.

7. The dual output actuator as in claim 1, wherein the gear has a first protrusion configured to engage a cavity of the first output when the gear is rotating the first output and a second protrusion configured to engage a cavity of the second output when the gear is rotating the second output such that as gear rotates about the axis the gear provides independent rotation of the first output and the second output about the axis.

8. The dual output actuator as in claim 7, wherein the first output has a tab that is configured to make contact with stopping ribs of a cover of the actuator and the second output is provided with a tab that is configured to make contact with stopping ribs of a housing of the actuator.

9. The dual output actuator as in claim 1, wherein the first output has a tab that is configured to make contact with stopping ribs of a cover of the actuator and the second output is provided with a tab that is configured to make contact with stopping ribs of a housing of the actuator.

10. The dual output actuator as in claim 7, wherein the first output is provided with a sealing member to provide a seal between the first output and an opening in a cover of the actuator and the second output is provided with a sealing member to provide a seal between the second output and an opening in a housing of the actuator.

11. The dual output actuator as in claim 1, wherein the gear is slidably and rotationally mounted to the first output and the second output.

12. The dual output actuator as in claim 11, wherein the gear has a first protrusion configured to engage a cavity of the first output when the gear is rotating the first output and a second protrusion configured to engage a cavity of the second output when the gear is rotating the second output such that as gear rotates about the axis the gear provides independent rotation of the first output and the second output about the axis.

13. The dual output actuator as in claim 1, wherein the gear is moved axially along the axis by a first worm gear operably coupled to the gear.

14. The dual output actuator as in claim 13, further comprising a driving mechanism for rotating the first worm gear.

15. The dual output actuator as in claim 14, wherein the gear has a first protrusion configured to engage a cavity of the first output when the gear is rotating the first output and a second protrusion configured to engage a cavity of the second output when the gear is rotating the second output such that as gear rotates about the axis the gear provides independent rotation of the first output and the second output about the axis.

16. The dual output actuator as in claim 15, wherein the first output has a tab that is configured to make contact with stopping ribs of a cover of the actuator and the second output is provided with a tab that is configured to make contact with stopping ribs of a housing of the actuator.

17. An active grill shutter system, comprising:
    a plurality of vanes including a first portion of vanes and a second portion of vanes;
    a dual output actuator, comprising:
    a first output rotationally mounted about an axis, the first output operably coupled to the first portion of vanes;
    a second output rotationally mounted about the axis, the second output operably coupled to the second portion of vanes, the first output capable of independent rotation about the axis with respect to the second output and the second output capable of independent rotation about the axis with respect to the first output; and
    a gear rotationally mounted about the axis, the gear being capable of independently rotating either the first output or the second output by moving axially along the axis; and
    the gear having an inner opening that slidably receives a first portion of the first output and a second portion of the second output.

18. The active grill shutter system as in claim 17, wherein the gear has a first protrusion configured to engage a cavity of the first output when the gear is rotating the first output and a second protrusion configured to engage a cavity of the second output when the gear is rotating the second output such that as gear rotates about the axis the gear provides independent rotation of the first output and the second output about axis.

19. The active grill shutter system as in claim 18, wherein the first output has a tab that is configured to make contact with stopping ribs of a cover of the actuator and the second output is provided with a tab that is configured to make contact with stopping ribs of a housing of the actuator.

20. A method of providing a dual output from an actuator of an active grill shutter system, comprising:
   rotationally mounting a first output about an axis;
   rotationally mounting a second output about the axis, the first output capable of independent rotation about the axis with respect to the second output and the second output capable of independent rotation about the axis with respect to the first output; and
   rotationally mounting a gear about the axis, the gear being capable of independently rotating either the first output or the second output by moving axially along the axis, the gear having an inner opening that slidably receives a first portion of the first output and a second portion of the second output.

* * * * *